US012598526B2

(12) United States Patent
Cheng et al.

(10) Patent No.: US 12,598,526 B2
(45) Date of Patent: Apr. 7, 2026

(54) METHOD AND APPARATUS FOR CELL RESELECTION FOR NETWORK ENERGY SAVING IN MOBILE COMMUNICATIONS

(71) Applicant: MediaTek Inc., Hsinchu (TW)

(72) Inventors: Chien-Chun Cheng, Hsinchu (TW);
Shiauhe Tsai, San Jose, CA (US);
Wei-De Wu, Hsinchu (TW)

(73) Assignee: MediaTek Inc., Hsinchu City (TW)

( * ) Notice: Subject to any disclaimer, the term of this patent is extended or adjusted under 35 U.S.C. 154(b) by 177 days.

(21) Appl. No.: 18/211,265

(22) Filed: Jun. 18, 2023

(65) Prior Publication Data

US 2024/0031896 A1 Jan. 25, 2024

Related U.S. Application Data

(60) Provisional application No. 63/369,261, filed on Jul. 25, 2022.

(51) Int. Cl.
| | |
|---|---|
| *H04W 36/16* | (2009.01) |
| *H04W 36/08* | (2009.01) |
| *H04W 48/02* | (2009.01) |
| *H04W 48/12* | (2009.01) |
| *H04W 52/02* | (2009.01) |
| *H04W 68/02* | (2009.01) |

(52) U.S. Cl.
CPC ......... *H04W 36/165* (2013.01); *H04W 36/08* (2013.01); *H04W 68/02* (2013.01)

(58) Field of Classification Search
CPC . H04W 36/165; H04W 36/08; H04W 36/085;
H04W 36/087; H04W 36/10; H04W
36/12; H04W 36/14; H04W 36/142;
H04W 36/16; H04W 68/02; H04W 48/02;
H04W 48/12; H04W 48/20; H04W
52/0206; Y02D 30/70
See application file for complete search history.

(56) References Cited

U.S. PATENT DOCUMENTS

| | | | | |
|---|---|---|---|---|
| 2012/0122495 A1* | 5/2012 | Weng | ......... | H04W 68/025 |
| | | | | 455/458 |
| 2014/0018077 A1* | 1/2014 | Zhong | ......... | H04W 52/0206 |
| | | | | 455/436 |
| 2014/0248883 A1* | 9/2014 | Aoyagi | ......... | H04W 48/16 |
| | | | | 455/436 |
| 2015/0173039 A1* | 6/2015 | Rune | ......... | H04W 52/0216 |
| | | | | 370/311 |
| 2016/0255580 A1* | 9/2016 | Onaka | ......... | H04W 92/20 |
| | | | | 370/311 |
| 2023/0156601 A1* | 5/2023 | Abdelghaffar | ........ | H04L 5/0051 |
| | | | | 370/318 |
| 2023/0344592 A1* | 10/2023 | Zhou | ......... | H04W 52/0235 |

(Continued)

*Primary Examiner* — Jenee Holland

(74) *Attorney, Agent, or Firm* — Andy M. Han; Han IP PLLC

(57) ABSTRACT

Various solutions for cell reselection for network energy saving with respect to user equipment and network apparatus in mobile communications are described. An apparatus may receive a network energy saving assistant information (NESAI) from a network node. The NESAI may comprise a cell barred field or a cell reservation field for network energy saving (NWES) configured to differentiate between non-NES user equipments (UEs) and NES-capable UEs. The apparatus may perform a cell reselection for a network energy saving (NES) cell based on the NESAI.

17 Claims, 4 Drawing Sheets

600

RECEIVE, BY A PROCESSOR OF AN APPARATUS, A NETWORK ENERGY SAVING ASSISTANT INFORMATION (NESAI) FROM A NETWORK NODE, WHEREIN THE NESAI COMPRISES A CELL BARRED FIELD OR A CELL RESERVATION FIELD FOR NETWORK ENERGY SAVING (NWES) CONFIGURED TO DIFFERENTIATE BETWEEN NON-NES USER EQUIPMENTS (UEs) AND NES-CAPABLE UEs
610

PERFORM, BY THE PROCESSOR, A CELL RESELECTION FOR A NETWORK ENERGY SAVING (NES) CELL BASED ON THE NESAI
620

(56)  References Cited

U.S. PATENT DOCUMENTS

| | | | | |
|---|---|---|---|---|
| 2023/0354184 A1* | 11/2023 | Abedini | ............ | H04W 52/0206 |
| 2023/0379828 A1* | 11/2023 | He | .................... | H04W 52/0245 |
| 2023/0388923 A1* | 11/2023 | Baek | ................ | H04W 52/0206 |
| 2023/0388968 A1* | 11/2023 | Yang | ................... | H04W 68/025 |
| 2023/0389120 A1* | 11/2023 | Babaei | ............. | H04W 52/0235 |
| 2024/0023061 A1* | 1/2024 | Abedini | ................ | H04W 68/02 |
| 2024/0031849 A1* | 1/2024 | Abedini | ................ | H04W 24/10 |
| 2024/0049204 A1* | 2/2024 | Sha | ......................... | H04L 5/001 |
| 2024/0147371 A1* | 5/2024 | He | ...................... | H04W 68/025 |
| 2024/0172123 A1* | 5/2024 | Wang | ................. | H04W 52/028 |
| 2024/0244583 A1* | 7/2024 | Cui | ................... | H04W 72/0446 |
| 2024/0349192 A1* | 10/2024 | He | ........................ | H04W 76/28 |
| 2024/0357500 A1* | 10/2024 | He | .................... | H04W 72/1273 |
| 2025/0007667 A1* | 1/2025 | Luo | ....................... | H04L 5/0051 |
| 2025/0016677 A1* | 1/2025 | He | .................... | H04W 52/0235 |
| 2025/0016737 A1* | 1/2025 | Fu | ..................... | H04W 52/0229 |
| 2025/0024375 A1* | 1/2025 | Xu | .................... | H04W 52/0216 |
| 2025/0048148 A1* | 2/2025 | Xu | .................... | H04W 52/0235 |
| 2025/0081099 A1* | 3/2025 | Sha | ....................... | H04L 1/1822 |
| 2025/0159603 A1* | 5/2025 | Choe | .................... | H04W 88/02 |

* cited by examiner

100 ⌐

200 ⌐

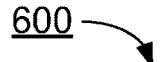

600

RECEIVE, BY A PROCESSOR OF AN APPARATUS, A
NETWORK ENERGY SAVING ASSISTANT INFORMATION
(NESAI) FROM A NETWORK NODE, WHEREIN THE
NESAI COMPRISES A CELL BARRED FIELD OR A CELL
RESERVATION FIELD FOR NETWORK ENERGY SAVING
(NWES) CONFIGURED TO DIFFERENTIATE BETWEEN
NON-NES USER EQUIPMENTS (UEs) AND NES-
CAPABLE UEs
610

PERFORM, BY THE PROCESSOR, A CELL RESELECTION
FOR A NETWORK ENERGY SAVING (NES) CELL BASED
ON THE NESAI
620

FIG. 6

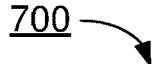

700

DETERMINE, BY A PROCESSOR OF A NETWORK NODE, A
NETWORK ENERGY SAVING ASSISTANT INFORMATION
(NESAI), WHEREIN THE NESAI COMPRISES A CELL
BARRED FIELD OR A CELL RESERVATION FIELD FOR
NETWORK ENERGY SAVING (NWES) CONFIGURED TO
DIFFERENTIATE BETWEEN NON-NES USER EQUIPMENTS
(UEs) AND NES-CAPABLE UEs
710

TRANSMIT, BY THE PROCESSOR, THE NESAI TO A USER
EQUIPMENT (UE)
720

FIG. 7

METHOD AND APPARATUS FOR CELL RESELECTION FOR NETWORK ENERGY SAVING IN MOBILE COMMUNICATIONS

CROSS REFERENCE TO RELATED PATENT APPLICATION(S)

The present disclosure is part of a non-provisional application claiming the priority benefit of U.S. Patent Application No. 63/369,261, filed 25 Jul. 2022, the content of which herein being incorporated by reference in its entirety.

TECHNICAL FIELD

The present disclosure is generally related to mobile communications and, more particularly, to cell reselection for network energy saving in mobile communications with respect to user equipment (UE) and network apparatus in mobile communications.

BACKGROUND

Unless otherwise indicated herein, approaches described in this section are not prior art to the claims listed below and are not admitted as prior art by inclusion in this section.

The network (NW) energy saving is important for maintaining the environmental sustainability, reducing the environmental impact (e.g., greenhouse gas emissions) and reducing the operating cost.

However, as the 5G technology is becoming more popular, more services and applications (e.g., extended reality (XR)) may require higher data rate. That is, the networks may be built more densely, and the networks may need to use more antennas, bandwidths, and frequency bands. As a result, the NW energy consumption will be increased. Therefore, how to achieve the network (NW) energy saving becomes an important issue.

It may be an efficient way to achieve the NW energy savings by turning on or turning off the base station (BS) or cell dynamically. For example, if the NW deactivates six BSs from seven active BSs, it may save 69% BS energy consumption. In the conventional 5G system, the NW may turn on or turn off the cell dynamically by using the secondary cell (SCell) Activation/Deactivation media-access-control control-element (MAC-CE) commend. However, for a primary cell (PCell), there is no efficient way to turn off the PCell in view of the current technology.

Accordingly, how to turn off the PCell efficiently for network energy saving becomes an important issue for the newly developed wireless communication network. Therefore, there is a need to provide proper schemes and designs for the cell reselection in response to the network energy saving.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

One objective of the present disclosure is propose schemes, concepts, designs, systems, methods and apparatus pertaining to cell reselection for network energy saving in mobile communications. It is believed that the above-described issue would be avoided or otherwise alleviated by implementing one or more of the proposed schemes described herein.

In one aspect, a method may involve an apparatus receiving a network energy saving assistant information (NESAI) from a network node, wherein the NESAI comprises a cell barred field or a cell reservation field for network energy saving (NWES) configured to differentiate between non-NES user equipments (UEs) and NES-capable UEs. The method may also involve the apparatus performing a cell reselection for a network energy saving (NES) cell based on the NESAI.

In another aspect, an apparatus may involve a transceiver which, during operation, wirelessly communicates with at least one network node. The apparatus may also involve a processor communicatively coupled to the transceiver such that, during operation, the processor performs following operations: receiving, via the transceiver, a NESAI from the network node, wherein the NESAI comprises a cell barred field or a cell reservation field for NWES configured to differentiate between non-NES UEs and NES-capable UEs; and performing a cell reselection for a NES cell based on the NESAI.

In another aspect, a method may involve a network node determining a NESAI, wherein the NESAI comprises a cell barred field or a cell reservation field for NWES configured to differentiate between non-NES UEs and NES-capable UEs. The method may also involve the network node transmitting the NESAI to a UE.

It is noteworthy that, although description provided herein may be in the context of certain radio access technologies, networks and network topologies such as 5th Generation System (5GS) and 4G EPS mobile networking, the proposed concepts, schemes and any variation(s)/derivative(s) thereof may be implemented in, for and by other types of wireless and wired communication technologies, networks and network topologies such as, for example and without limitation, Ethernet, Universal Terrestrial Radio Access Network (UTRAN), E-UTRAN, Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, IoT, Industrial IoT (IIoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 6 is a flowchart of an example process in accordance with an implementation of the present disclosure.

FIG. 7 is a flowchart of another example process in accordance with an implementation of the present disclosure.

DETAILED DESCRIPTION OF PREFERRED IMPLEMENTATIONS

Figure 1:
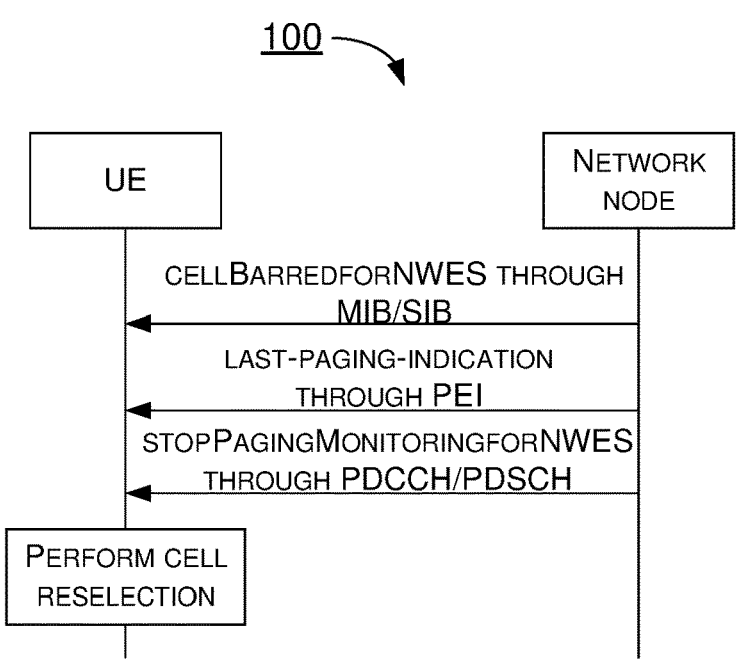
FIG. 1 is a diagram depicting an example scenario of a cell reselection under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to cell reselection for network energy saving in mobile communications. According to the present disclosure, a number of possible solutions may be implemented separately or jointly. That is, although these possible solutions may be described below separately, two or more of these possible solutions may be implemented in one combination or another.

When the network node turns off a primary cell (PCell), the network node may hand over the connected user equipments (UEs) to another active cell, release a radio resource control (RRC) connection for the connected UEs to perform cell selection, and trigger a cell reselection for the idle UEs that camp normally. For the UEs in the RRC connected state, the network node may send unicast RRC messages to complete the task. However, it may not be signaling efficient.

The UE may choose not to perform intra-frequency measurements for cell reselection if the serving cell fulfills some rules (e.g., Srxlev>$S_{IntrasearchP}$ and Squal>$S_{IntrasearchQ}$). However, for the UEs in the RRC idle state and in the inactive state, the reference signal received power (RSRP)/reference signal received quality (RSRQ)-based criteria (i.e., criterion S) may not be enough to trigger cell reselection when a PCell is turned off. If the network node expects to turn off a cell for energy saving due to a low traffic load, the UE should trigger cell reselection even if the current serving cell RSRP is still good. However, such cell reselection operation of the UE is not supported in the current technology. In a worse case, the UE may select a cell and camp on the cell, but the cell may be turned off soon by the network node. It may lead to non-necessary UE power consumption and delay.

For example, an idle UE may measure the synchronization signal (SS)-RSRP and SS-RSRQ of the serving cell to evaluate criterion S per discontinuous reception (DRX) cycle of 1.28 second (s). If the network node turns off the serving cell, the UE may need to wait for another DRX-cycle of 1.28 s (M1=N1=1) to determine whether to trigger cell reselection. In another example, the UE may wait for 2.56 s of two DRX cycles if synchronization signal block (SSB) measurement timing configuration (SMTC) periodicity (T_SMTC)>20 millisecond (ms) and DRX cycle ≤0.64 second (M1=2 and N1=1). The UE may measure RSRP and RSRQ at least once every M1 times N1 DRX cycle. The UE may determine M1 based on SMTC and DRX configurations provided by the network node. The UE may determine N1 based on operation bands, e.g., frequency range (FR)1 or FR2.

Accordingly, the present disclosure proposes some solutions to resolve the issues.

FIG. 1 illustrates an example scenario 100 for a cell reselection under schemes in accordance with implementations of the present disclosure. Scenario 100 involves a network node (e.g., a macro base station and multiple micro base stations) and a UE, which may be a part of a wireless communication network (e.g., an LTE network, a 5G/NR network, an IoT network or a 6G network). Referring to FIG. 1, the UE may receive network energy saving assistant information (NESAI) from the network node. The UE may receive the NESAI when the UE will be relocated out from the serving cell due to that the serving cell (or camped cell) is turned off by the network node. The NESAI may be used to trigger cell reselection for the idle UE in addition to the S-criteria. The UE may perform a cell reselection for a network energy saving (NES) cell (e.g., the cell turned off by the network node) based on the NESAI. That is, the NESAI may indicate when the UE will be reallocated out from the NES cell. At least a part of functionalities of the NES cell may be turned off by the network node for the NWES.

The NESAI may comprise a cell barred field or a cell reservation field for network energy saving (NWES). The cell barred field or the cell reservation field may be configured to differentiate between non-NES user equipments (UEs) and NES-capable UEs. The non-NES UEs are not allowed to camp on the NES cell, but the NES-capable UEs are allowed to camp on the NES cell.

In some implementations, the NESAI may further comprise or associate with at least one of a stop paging monitoring indication for NWES, a containing grace period indicating time information on when the NES cell will stop serving, a last system information block (SIB) indication, a last system frame number (SFN) indication, a last paging indication, a last paging early indication (PEI) indication, a last downlink control information (DCI) indication and a last physical downlink shared channel (PDSCH) indication.

In some implementations, the UE may receive the NESAI from the network node through a master information block (MIB), a SIB, a PEI, a physical downlink control channel (PDCCH) in a paging occasion (PO) or a PDSCH in the PO. The network node may broadcast the NESAI to a group of UEs. The UE may receive a UE identification (ID) or a group ID through RRC signaling. As shown in FIG. 1, in an example, the UE may receive the cellBarredforNWES (i.e., the cell barred field or the cell reservation field) through the MIB or SIB, the UE may receive the last paging indication through the PEI, and the UE may receive the stopPaging-MonitoringforNWES (i.e., the stop paging monitoring indication for the NWES) through the PDCCH or the PDSCH.

In some implementations, in the MIB, the UE may receive cellBarredforNWES (i.e., the cell barred field or the cell reservation field) with information element (IE) types of barred or not barred. The cellBarredforNWES with the value "barred" may mean that a cell is barred, and the UE is not allowed to camp on the barred cell. In an example, the cellBarredforNWES may comprise received bits for future usage, a sleep time until cell reactivation (values may be in minutes), or a remaining time before cell deactivation (values may be in ms).

In some implementations, in the SIBs, the UE may receive a containing grace period (e.g., a containing grace period field). The containing grace period may indicate the time information when a cell will stop serving. The containing grace period may be used to count the number of coordinated universal time (UTC) seconds or a timer in 10 ms. Changes in the containing grace period may neither result in system information (SI) change notifications nor modify the value tag in SIB1.

In some implementations, in the SIBs, the UE may receive the last SIB indication (or last-SIB-indication). The last SIB indication may indicate that the received SIB may be the last SIB, or the last SIB period which the serving cell may broadcast before the serving cell is turned off by the network node.

In some implementations, in the SIBs, the UE may receive the last SFN indication (or last-SFN-indication). The last SFN indication may indicate that the received the SFN may be the last SFN which the serving cell broadcasts before the serving cell is turned off by the network node.

In some implementations, in the PEI, the UE may receive the last-paging-indication. The last-paging-indication may indicate that the PO indicated by the received DCI format 2_7 may be the last PO which the UE should monitor. The last PO may be one or more POs configured through the RRC signaling.

In some implementations, in the PEI, the UE may receive the last PEI indication (or last-PEI-indication). The last PEI indication may indicate that the received PEI may be the last PEI provided by the serving cell before the serving cell is turned off by the network node.

In some implementations, in the PDCCH of the PO, the UE may receive the last DCI indication (or last-DCI-indication) in the DCI format 1_O. The last DCI indication may indicate the received DCI may be the last DCI provided by the serving cell.

In some implementations, in the PDSCH of the PO, the UE may receive the last PDSCH indication (or last-PDSCH-indication) in the paging message or in the short message. The last PDSCH indication may indicate the received PDSCH may be the last PDSCH provided by the serving cell.

In some implementations, in the PDSCH of the PO, the UE may receive the stop paging monitoring indication for the NWES (e.g., stopPagingMonitoringforNWES) in the short message. The stop paging monitoring indication may indicate that UE may stop monitoring PDCCH occasion for paging.

In some implementations, the UE may obtain the cell barred field (or the cell reservation) field, the stop paging monitoring indication for the NWES and containing grace period through the MIB, the SIB1 (or other SIB), the PEI, the PDCCH, or the PDSCH.

Figure 2:
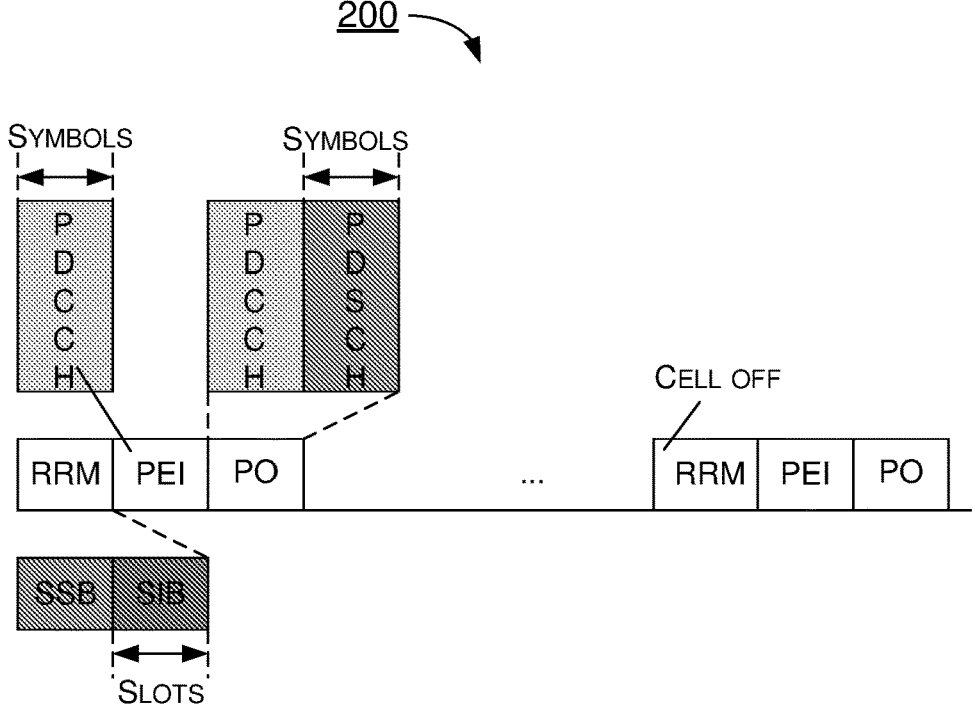
FIG. 2 is a diagram depicting an example scenario of a network energy saving assistant information (NESAI) configuration under schemes in accordance with implementations of the present disclosure.

FIG. 2 illustrates an example scenario 200 for a NESAI configuration under schemes in accordance with implementations of the present disclosure. Scenario 200 involves a network node (e.g., a macro base station and multiple micro base stations) and a UE, which may be a part of a wireless communication network (e.g., an LTE network, a 5G/NR network, an IoT network or a 6G network). Referring to FIG. 2, the UE may receive the NESAI through at least one of the SIB, the PEI, the PDCCH in the PO, and the PDSCH in the PO. Therefore, the UE may perform the cell reselection for the NES cell based on the NESAI. That is, the UE will not trigger the cell reselection after a paging DRX cycle.

In some implementations, the UE may receive a UE capability enquiry (e.g., a UECapabilityEnquiry) from the network node. Then, the UE transmit a UE capability information to the network node to indicate whether the cell reselection for the NES cell is supported.

For automatic core network (CN) relocation, the network nodes in the power saving mode may "borrow" a paging capacity of the network nodes in a different tracking area (but under normal operation it does not want to overload the paging capacity of the network nodes). Therefore, the UE may check other cells belonging to a different tracking area for the NESAI. The NESAI may comprise at least one of a frequency band, a cell ID, a tracking area code, and a global cell identity. The UE may use the NESAI to perform cell reselection to the suggested cells.

In some implementations, the UE may perform the intra-frequency, inter-frequency, or inter-RAT measurements for the cell reselection if the cellBarredforNWES (i.e., the cell barred field or the cell reservation field) is set to barred. The exact time to start the measurements for the cell reselection may be up to UE implementation. The UE may stop monitoring PDCCH occasions or any uplink (UL) transmission if the cellBarredforNWES is set to barred. The UE may ignore whether the serving cell fulfills criterion S if the UE receives the cellBarredforNWES (i.e., the cell barred field or the cell reservation field) from the network node.

Figure 3:
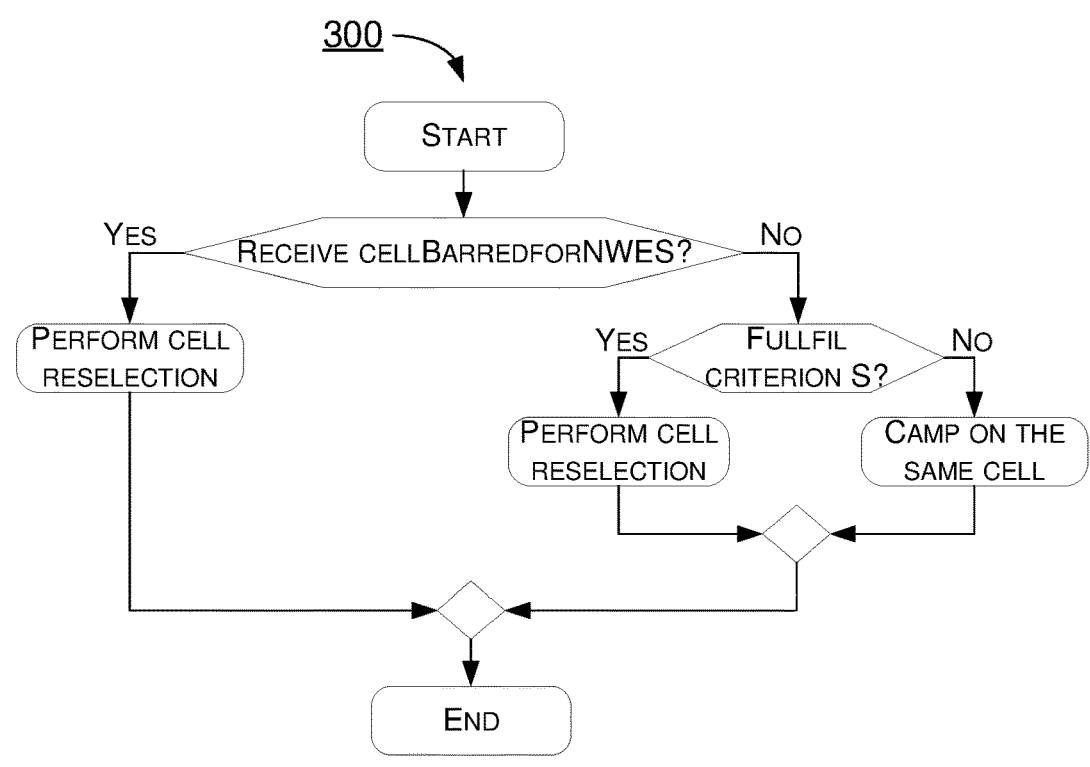
FIG. 3 is a diagram depicting an example scenario of a cell reselection process under schemes in accordance with implementations of the present disclosure.

FIG. 3 illustrates an example scenario 300 for a cell reselection process under schemes in accordance with implementations of the present disclosure. Scenario 300 involves a network node (e.g., a macro base station and multiple micro base stations) and a UE, which may be a part of a wireless communication network (e.g., an LTE network, a 5G/NR network, an IoT network or a 6G network). Referring to FIG. 3, the UE may determine whether the cellBarredforNWES (i.e., the cell barred field or the cell reservation field) is received from the network node. When the UE receives the cellBarredforNWES (i.e., the cell barred field or the cell reservation field) from the network node, the UE may perform cell reselection based on the cellBarredforNWES. When the UE does not receive the cellBarredforNWES from the network node, the UE may determine whether to perform cell reselection based on the criterion S.

In some implementations, the UE may perform the intra-frequency, inter-frequency, or inter-RAT measurements for the cell reselection if the last-SIB-indication is set to 1. The UE may stop monitoring PDCCH occasions or any UL transmission if the last-SIB-indication is set to 1. The same UE behavior may be applied when the UE receives the last-SFN-indication, the last-paging-indication, the last-PEI-indication, the last-DCI-indication, or last-PDSCH-indication. The exact time to start the measurements for the cell reselection may be up to UE implementation, or may be right after the end of the last SIB, the last SFN, or the last PDSCH. The UE may ignore whether the serving cell fulfills criterion S if the UE receives the last-SIB-indication, the last-SFN-indication, the last-paging-indication, the last-PEI-indication, the last-DCI-indication, or last-PDSCH-indication from the network node.

In some implementations, if the containing grace period has been provided by the network cell, the UE may perform intra-frequency, inter-frequency, or inter-RAT measurements for the cell reselection before the containing grace period or before the containing grace period timer expires. The UE may ignore whether the serving cell fulfills the criterion S if the UE receives the containing grace period from the network node. The exact time to start the measurements for the cell reselection before containing grace period may be up to UE implementation, or may be on time given by the containing grace period.

Figure 4:
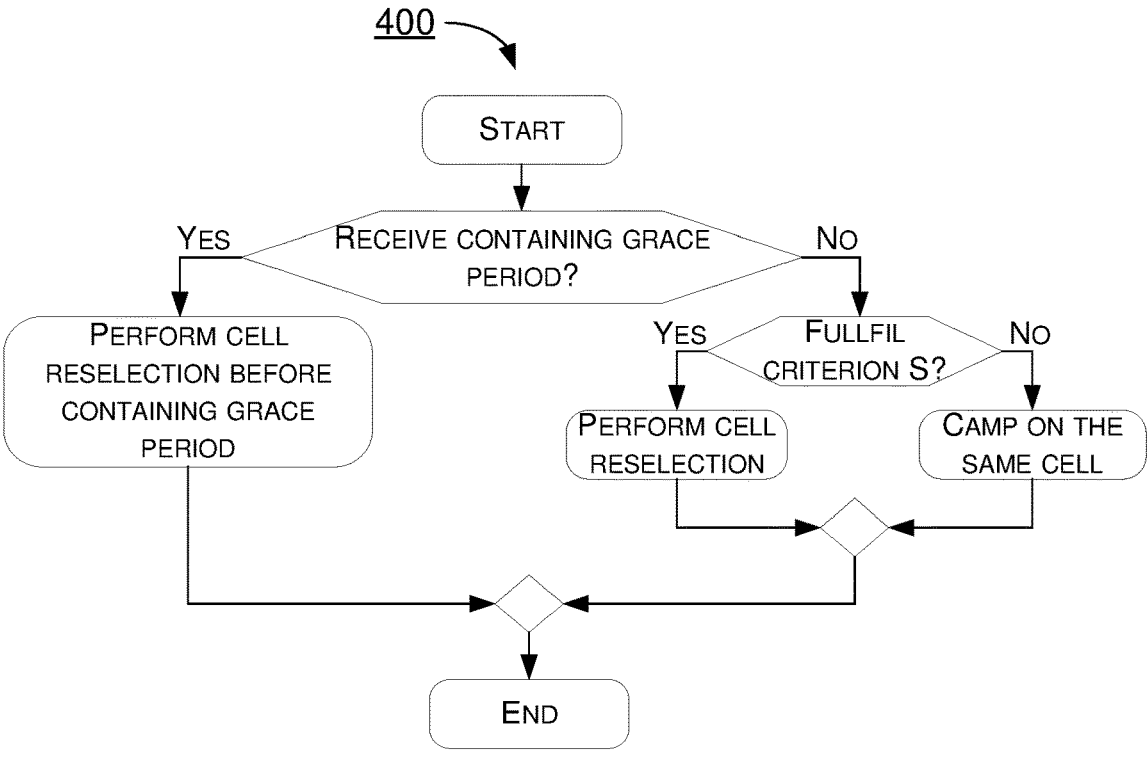
FIG. 4 is a diagram depicting another example scenario of a cell reselection process under schemes in accordance with implementations of the present disclosure.

FIG. 4 illustrates another example scenario 400 for a cell reselection process under schemes in accordance with implementations of the present disclosure. Scenario 400 involves a network node (e.g., a macro base station and multiple micro base stations) and a UE, which may be a part of a wireless communication network (e.g., an LTE network, a 5G/NR network, an IoT network or a 6G network). Referring to FIG. 4, the UE may determine whether the containing grace period is received from the network node. When the UE receives the containing grace period from the network node, the UE may perform cell reselection before the containing grace period based on the containing grace period. When the UE does not receive the containing grace period from the network node, the UE may determine whether to perform cell reselection based on the criterion S.

In some implementations, the UE may stop monitoring PDCCH occasion(s) for paging in one or multiple paging occasions, paging frames, PDCCH monitoring occasions, DRX cycles, system frames, or a pre-configured absolute time period, e.g., 10 s, if the stopPagingMonitoring-forNWES (i.e., the stop paging monitoring indication for the NWES) is set to 1. The one or multiple occasions may start when UE receives stopPagingMonitoringforNWES set to 1, and the number of multiple occasions may be configured through the RRC signaling or SIB.

Illustrative Implementations

Figure 5:
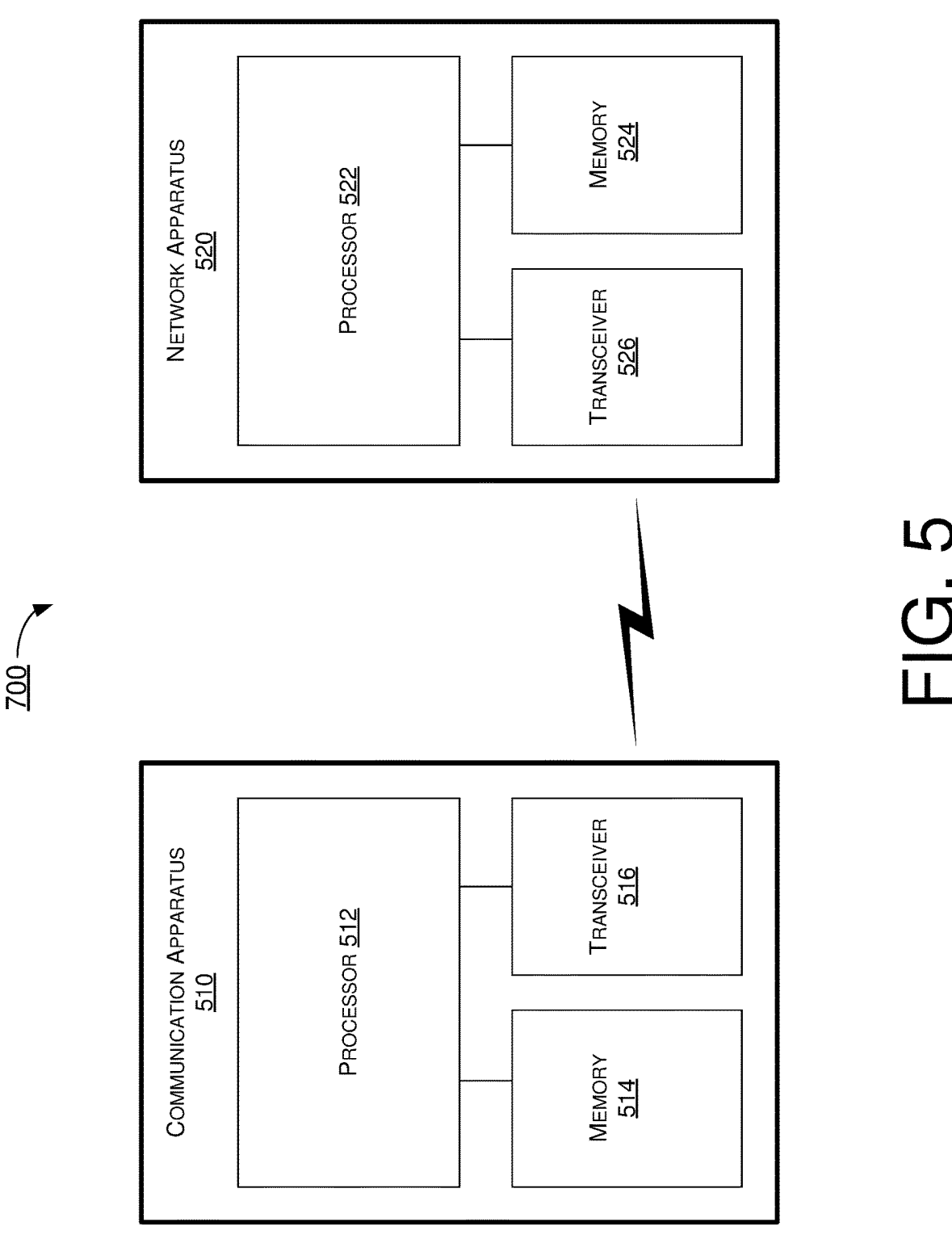
FIG. 5 is a block diagram of an example communication system in accordance with an implementation of the present disclosure.

FIG. 5 illustrates an example communication system 500 having at least an example communication apparatus 510 and an example network apparatus 520 in accordance with an implementation of the present disclosure. Each of communication apparatus 510 and network apparatus 520 may perform various functions to implement schemes, techniques, processes and methods described herein pertaining to the cell reselection in mobile communications, including the various schemes described above with respect to various proposed designs, concepts, schemes and methods described above and with respect to user equipment and network apparatus in mobile communications, including scenarios/schemes described above as well as process 600 and process 700 described below Communication apparatus 510 may be a part of an electronic apparatus, which may be a UE such as a portable or mobile apparatus, a wearable apparatus, a wireless communication apparatus or a computing apparatus. For instance, communication apparatus 510 may be implemented in a smartphone, a smartwatch, a personal digital assistant, a digital camera, or a computing equipment such as a tablet computer, a laptop computer or a notebook computer. Communication apparatus 510 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 510 may be implemented in a smart thermostat, a smart fridge, a smart door lock, a wireless speaker or a home control center. Alternatively, communication apparatus 510 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 510 may include at least some of those components shown in FIG. 5 such as a processor 512, for example. Communication apparatus 510 may further include one or more other components not pertinent to the proposed scheme of the present disclosure (e.g., internal power supply, display device and/or user interface device), and, thus, such component(s) of communication apparatus 510 are neither shown in FIG. 5 nor described below in the interest of simplicity and brevity.

Network apparatus 520 may be a part of a network apparatus, which may be a network node such as a satellite, a base station, a small cell, a router or a gateway. For instance, network apparatus 520 may be implemented in an eNodeB in an LTE network, in a gNB in a 5G/NR, IoT, NB-IoT or IIoT network or in a satellite or base station in a 6G network. Alternatively, network apparatus 520 may be implemented in the form of one or more IC chips such as, for example and without limitation, one or more single-core processors, one or more multi-core processors, or one or more RISC or CISC processors. Network apparatus 520 may include at least some of those components shown in FIG. 5 such as a processor 522, for example. Network apparatus 520 may further include one or more other components not pertinent to the proposed scheme of the present disclosure (e.g., internal power supply, display device and/or user interface device), and, thus, such component(s) of network apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including autonomous reliability enhancements in a device (e.g., as represented by communication apparatus 510) and a network (e.g., as represented by network apparatus 520) in accordance with various implementations of the present disclosure.

In some implementations, communication apparatus 510 may also include a transceiver 516 coupled to processor 512 and capable of wirelessly transmitting and receiving data. In some implementations, communication apparatus 510 may further include a memory 514 coupled to processor 512 and capable of being accessed by processor 512 and storing data therein. In some implementations, network apparatus 520 may also include a transceiver 526 coupled to processor 522 and capable of wirelessly transmitting and receiving data. In some implementations, network apparatus 520 may further include a memory 524 coupled to processor 522 and capable of being accessed by processor 522 and storing data therein. Accordingly, communication apparatus 510 and network apparatus 520 may wirelessly communicate with each other via transceiver 516 and transceiver 526, respectively. To aid better understanding, the following description of the operations, functionalities and capabilities of each of communication apparatus 510 and network apparatus 520 is provided in the context of a mobile communication environment in which communication apparatus 510 is implemented in or as a communication apparatus or a UE and network apparatus 520 is implemented in or as a network node of a communication network.

In some implementations, processor 512 may receive, via transceiver 516, a NESAI from network apparatus 520, wherein the NESAI may comprise a cell barred field or a cell reservation field for NWES configured to differentiate between non-NES UEs and NES-capable UEs. Processor 512 may perform a cell reselection for a NES cell based on the NESAI.

In some implementations, the cell barred field or the cell reservation field may indicate whether the NES-capable UEs are allowed camping on the NES cell.

In some implementations, processor 512 may receive, via transceiver 516, the NESAI from the network node through a MIB, a SIB, a PEI, a PDCCH in a PO or a PDSCH in the PO.

In some implementations, the NESAI may comprise at least one of a stop paging monitoring indication for NWES, a containing grace period indicating time information on when the NES cell will stop serving, a last SIB indication, a last SFN indication, a last paging indication, a last PEI indication, a last DCI indication and a last PDSCH indication.

In some implementations, at least a part of functionalities of the NES cell may be turned off for the NWES.

In some implementations, the NESAI may indicate when the apparatus will be reallocated out from the NES cell.

In some implementations, processor 512 may receive, via transceiver 516, a UE capability enquiry from the network node. Processor 512 may transmit, via transceiver 516, a UE capability information to the network node to indicate whether the cell reselection for the NES cell is supported.

In some implementations, processor 522 may determine a NESAI, wherein the NESAI comprises a cell barred field or a cell reservation field for NWES configured to differentiate between non-NES UEs and NES-capable UEs. Processor 522 may transmit, via transceiver 526, the NESAI to communication apparatus 510.

In some implementations, processor 522 may transmit, via transceiver 526, the NESAI from the network node through a MIB, a SIB, a PEI, a PDCCH in a PO or a PDSCH in the PO.

Illustrative Processes

FIG. 6 illustrates an example process 600 in accordance with an implementation of the present disclosure. Process 600 may be an example implementation of above scenarios/ schemes, whether partially or completely, with respect to the cell reselection for network energy saving with the present disclosure. Process 600 may represent an aspect of implementation of features of communication apparatus 510. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks of process 600 may be executed in the order shown in FIG. 6 or, alternatively, in a different order. Process 600 may be implemented by communication apparatus 510 or any suitable UE or machine type devices. Solely for illustrative purposes and without limitation, process 600 is described below in the context of communication apparatus 510. Process 600 may begin at block 610.

At 610, process 600 may involve processor 512 of communication apparatus 510 receiving a NESAI from a network node, wherein the NESAI comprises a cell barred field or a cell reservation field for NWES configured to differentiate between non-NES UEs and NES-capable UEs. Process 600 may proceed from 610 to 620.

At 620, process 600 may involve processor 512 performing a cell reselection for a NES cell based on the NESAI.

In some implementations, process 600 may involve processor 512 receiving the NESAI from the network node through a MIB, a SIB, a PEI, a PDCCH in a PO or a PDSCH in the PO.

In some implementations, process 600 may involve processor 512 receiving a UE capability enquiry from the network node, and transmitting a UE capability information to the network node to indicate whether the cell reselection for the NES cell is supported.

FIG. 7 illustrates an example process 700 in accordance with an implementation of the present disclosure. Process 700 may be an example implementation of above scenarios/ schemes, whether partially or completely, with respect to the cell reselection for network energy saving with the present disclosure. Process 700 may represent an aspect of implementation of features of network apparatus 520. Process 700 may include one or more operations, actions, or functions as illustrated by one or more of blocks 710 and 720. Although illustrated as discrete blocks, various blocks of process 700 may be divided into additional blocks, combined into fewer blocks, or eliminated, depending on the desired implementation. Moreover, the blocks of process 700 may be executed in the order shown in FIG. 7 or, alternatively, in a different order. Process 700 may be implemented by network apparatus 720 or any base stations or network nodes. Solely for illustrative purposes and without limitation, process 700 is described below in the context of network apparatus 520. Process 700 may begin at block 710.

At 710, process 700 may involve processor 522 of network apparatus 520 determining a NESAI, wherein the NESAI comprises a cell barred field or a cell reservation field for NWES configured to differentiate between non-NES UEs and NES-capable UEs. Process 700 may proceed from 710 to 720.

At 720, process 700 may involve processor 522 transmitting the NESAI to a UE.

In some implementations, process 700 may involve processor 522 transmitting the NESAI from the network node through a MIB, a SIB, a PEI, a PDCCH in a PO or a PDSCH in the PO.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method of ultrafast cell selection, comprising:
receiving, by a processor of an apparatus, a network energy saving assistant information (NESAI) from a network node via a system information block (SIB), wherein the NESAI comprises a cell barred field or a cell reservation field for network energy saving (NWES) configured to differentiate between non-NES user equipments (UEs) and NES-capable UEs, and wherein the NESAI further comprises a paging early indication (PEI) to indicate a last paging indication; and
performing, by the processor, a cell reselection for a network energy saving (NES) cell based on the NESAI.

2. The method of claim 1, wherein the cell barred field or the cell reservation field indicates whether the NES-capable UEs are allowed camping on the NES cell.

3. The method of claim 1, wherein the NESAI further comprises at least one of a stop paging monitoring indication for NWES, a containing grace period indicating time information on when the NES cell will stop serving, a last SIB indication, a last system frame number (SFN) indication, a last PEI indication, a last downlink control information (DCI) indication and a last PDSCH indication.

4. The method of claim 1, wherein at least a part of functionalities of the NES cell are turned off for the NWES.

5. The method of claim 1, wherein the NESAI indicates when the apparatus will be reallocated out from the NES cell.

6. The method of claim 1, further comprising:
receiving, by the processor, a UE capability enquiry from the network node; and
transmitting, by the processor, a UE capability information to the network node to indicate whether the cell reselection for the NES cell is supported.

7. An apparatus, comprising:
a transceiver which, during operation, wirelessly communicates with at least one network node; and
a processor communicatively coupled to the transceiver such that, during operation, the processor performs operations comprising:
receiving, via the transceiver, a network energy saving assistant information (NESAI) from the network node via a system information block (SIB), wherein the NESAI comprises a cell barred field or a cell reservation field for network energy saving (NWES) configured to differentiate between non-NES user equipments (UEs) and NES-capable UEs, and wherein the NESAI further comprises a paging early indication (PEI) to indicate a last paging indication; and performing a cell reselection for a network energy saving (NES) cell based on the NESAI.

8. The apparatus of claim 7, wherein the cell barred field or the cell reservation field indicates whether the NES-capable UEs are allowed camping on the NES cell.

9. The apparatus of claim 7, wherein the NESAI further comprises at least one of a stop paging monitoring indication for NWES, a containing grace period indicating time information on when the NES cell will stop serving, a last SIB indication, a last system frame number (SFN) indication, a last PEI indication, a last downlink control information (DCI) indication and a last PDSCH indication.

10. The apparatus of claim 7, wherein at least a part of functionalities of the NES cell are turned off for the NWES.

11. The apparatus of claim 7, wherein the NESAI indicates when the apparatus will be reallocated out from the NES cell.

12. The apparatus of claim 7, during operation, the processor further performs operations comprising:

receiving, via the transceiver, a UE capability enquiry from the network node; and transmitting, via the transceiver, a UE capability information to the network node to indicate whether the cell reselection for the NES cell is supported.

13. A method, comprising:

determining, by a processor of a network node, a network energy saving assistant information (NESAI), wherein the NESAI comprises a cell barred field or a cell reservation field for network energy saving (NWES) configured to differentiate between non-NES user equipments (UEs) and NES-capable UEs, and wherein the NESAI further comprises a paging early indication (PEI) to indicate a last paging indication; and transmitting, by the processor, the NESAI to a user equipment (UE) via a system information block (SIB).

14. The method of claim 13, wherein the cell barred field or the cell reservation field indicates whether the NES-capable UEs are allowed camping on the NES cell.

15. The method of claim 13, wherein the NESAI comprises at least one of a stop paging monitoring indication for NWES, a containing grace period indicating time information on when the NES cell will stop serving, a last SIB indication, a last system frame number (SFN) indication, a last PEI indication, a last downlink control information (DCI) indication and a last PDSCH indication.

16. The method of claim 13, wherein at least a part of functionalities of the NES cell are turned off for the NWES.

17. The method of claim 13, wherein the NESAI indicates when the UE will be reallocated out from the NES cell.

\* \* \* \* \*